July 18, 1950 G. K. BARGER 2,515,179
METHOD OF PRODUCING CONTAINER BODIES
Filed Oct. 29, 1946
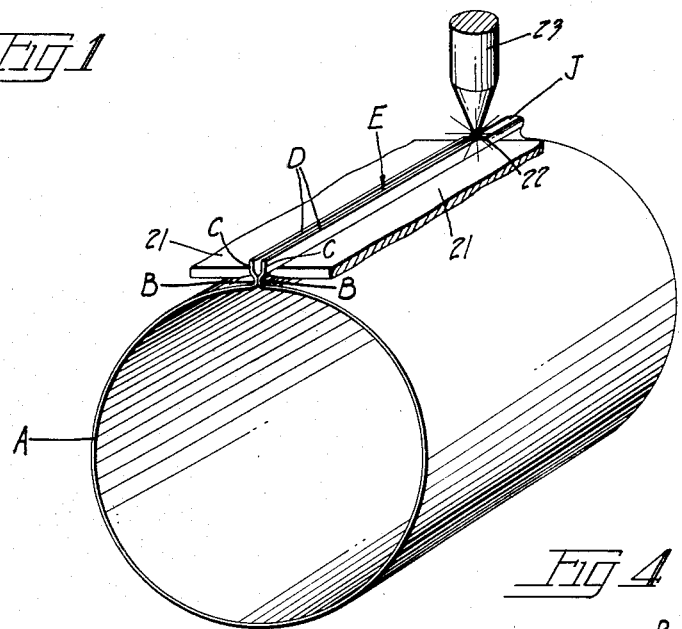
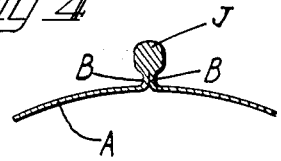
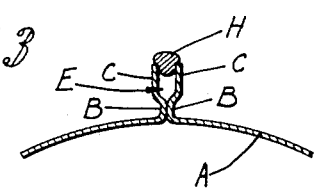
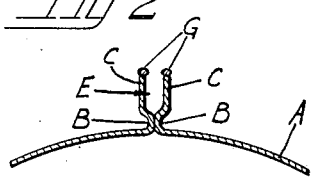
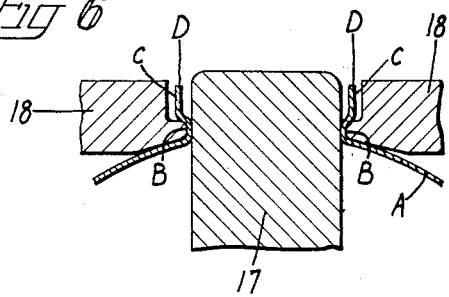
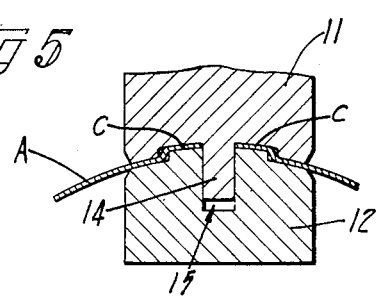
INVENTOR.
George K. Barger
BY Irian L. Thornburgh
Charles H. Ime
ATTORNEYS Patented July 18, 1950

2,515,179

UNITED STATES PATENT OFFICE 2,515,179

METHOD OF PRODUCING CONTAINER BODIES

George K. Barger, Seattle, Wash., assignor to American Can Company, New York, N. Y., a corporation of New Jersey Application October 29, 1946, Serial No. 706,425

1 Claim. (Cl. 219—10)

The present invention relates to a method of producing tubular sheet metal container or can bodies having welded side seams and has particular reference to forming the side seam edges of the bodies to facilitate welding of the seams.

An object of the invention is the provision of a method of producing can bodies having welded side seams wherein the marginal side seam portions of a body are brought together so as to form a trough for the reception of molten metal created from the terminal edges of these seam portions by the application of welding heat, which action welds the seam portions together in a unitary seam for the can body.

Another object is the provision of such a method of producing can bodies wherein the marginal side seam portions of the body are preformed prior to bringing them together so that upon engagement of the seam portions a trough of predetermined dimensions will be formed for the reception of the molten metal created during the welding operation.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a tubular can body being welded along its side seam edges in accordance with the steps of the instant method invention, the view showing parts of a welding apparatus with parts broken away;

Figs. 2, 3 and 4 are enlarged fragmentary sectional views of the side seam portions of a can body, the views showing different stages in the welding of the body; and Figs. 5 and 6 are enlarged fragmentary sectional views showing stages of preparing the side seam edges for welding and also showing principal parts of mechanism for forming the seam edges, with parts broken away.

As a preferred embodiment of the invention the drawings illustrate a sheet metal can body A, made of tin plate or the like material, having marginal side seam portions adapted to be united by welding to provide a side seam for the body.

In accordance with the steps of the instant method invention the marginal side seam portions of a can body A to be welded are formed with offset neck portions B which merge into straight and parallel walls C terminating in terminal edges D and are bent outwardly at substantially right angles to the body wall, as shown in Fig. 1. Preparatory to welding, the seam portions are brought together with their terminal edges in parallelism and in such position are clamped against displacement. In this position of the seam portions, the straight walls C are in spaced relation and thereby form a shallow trough E disposed between the terminal edges D.

With the seam portions in this clamped position, their terminal edges D are heated to a welding temperature. This heating action melts down or reduces the terminal edges D to a molten or plastic condition. During the first stages of this heating process a small nodule G (Fig. 2) of molten metal is formed on each of the heated edges D. Surface tension holds the nodule in place. As the heating process continues and the walls C are reduced to a molten condition, the nodules G on both edges grow in size until they merge or flow together into one single large nodule or mass H (Fig. 3) which bridges the trough E.

At this stage in the heating process, capillary attraction draws the fluid metal nodule down into the trough E, thus welding the two walls C together. This welding occurs rapidly and continuously along the entire length of the can body and thus produces a fully welded seam J for the body as shown in Fig. 4. After welding the body may be expanded and its side seam subjected to a hammer blow, if desired, to flatten out the seam portions and produce a smooth exterior for the body, if such an exterior is required.

One form of apparatus is shown in Figs. 5 and 6 for bending the seam portions of the body blank to form the offset neck portions B and wall sections C in the body prior to welding. In this apparatus the wall sections C and the neck portions B are first formed by clamping the marginal edge portions of the can body blank between a pair of cooperative bending die members 11, 12 (Fig. 5). A tongue 14 formed on the die member 11 serves as a stop for locating the edges D of the body in the die mechanism. This tongue passes into a clearance slot 15 formed in the opposing member 12.

After thus forming the neck portions B and the wall sections C in the can body, the marginal seam portions are bent outwardly by a die mechanism which includes a bending die 17 (Fig. 6) and a pair of jaws 18. The jaws 18 move into position adjacent the can body and then the bending die moves up (as viewed in Fig. 6) against the seam portions of the body and forces them outwardly against the jaws 18, bringing the walls C in a position where they will assume parallelism when the neck portions B are brought together, as shown in Fig. 2.

Bringing together of the formed neck portions B for the welding operation may be effected in any suitable manner as for example by well known forming wings or clamps associated with conventional can body forming machines. Such wings or other suitable clamps 21 (Fig. 1) may be utilized to hold the neck portions B of the body in place for welding.

Welding of the terminal edges D and walls C of the seam portions of the body preferably is effected by an electric welding arc 22 established by a suitable carbon electrode 23 for heating the terminal edges D to a welding temperature. The electrode and the can body preferably at the neck portions B by means of the clamps 21 are connected to a suitable source of electric welding current for the establishment and maintenance of the arc. The arc is established at one end of the terminal edges D of the body and the body or the electrode then is moved to cause the arc to travel the full length of the edges D to effect the full welding of the seam.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

A method of producing tubular container bodies of weldable material, which method comprises the steps of bending outwardly the opposed marginal seam edges of a tubular container body into opposed offset neck portions and spaced parallel terminal walls, clamping together said opposed neck portions to form an extended seam trough between said spaced walls and said neck portions, conducting an electric welding current between said walls and said neck portions to establish an effective welding arc which fuses said walls, the fused material filling said trough and homogeneously uniting the material into a welded seam for said container body, and relatively moving said welding arc and said tubular container body to progressively weld the seam along its entire extent.

GEORGE K. BARGER.

REFERENCES CITED

The following references are of record in the file of this patent:

UNITED STATES PATENTS

| Number | Name | Date |
| --- | --- | --- |
| 986,506 | Sargent | Mar. 14, 1911 |
| 1,220,774 | Murray | Mar. 27, 1917 |
| 1,248,831 | Dunham | Dec. 4, 1917 |
| 1,417,126 | Wunderlick | May 23, 1922 |
| 1,496,936 | Lowe | June 10, 1924 |
| 1,682,403 | Murray | Aug. 28, 1928 |
| 1,706,393 | Fay | Mar. 26, 1929 |
| 1,712,507 | Lawson | May 14, 1929 |
| 2,010,155 | Hull | Aug. 6, 1935 |

FOREIGN PATENTS

| Number | Country | Date |
| --- | --- | --- |
| 77,047 | Australia | Aug. 15, 1918 |